United States Patent
Iida et al.

(10) Patent No.: US 6,857,163 B2
(45) Date of Patent: Feb. 22, 2005

(54) POWER BLOWER HAVING A DEBRIS-CATCHING FILTER MEMBER

(75) Inventors: Giichi Iida, Tokyo (JP); Tadashi Kamoshita, Asaka (JP)

(73) Assignee: Kioritz Corporation, Tokyo (JP)

( * ) Notice: Subject to any disclaimer, the term of this patent is extended or adjusted under 35 U.S.C. 154(b) by 338 days.

(21) Appl. No.: 10/150,101

(22) Filed: May 20, 2002

(65) Prior Publication Data

US 2002/0174511 A1 Nov. 28, 2002

(30) Foreign Application Priority Data

May 24, 2001 (JP) ........................................ 2001-155247

(51) Int. Cl.⁷ ................................................. A47L 5/36
(52) U.S. Cl. ......................... 15/327.5; 15/330; 15/405
(58) Field of Search ................................ 15/327.5, 330, 15/405; 55/385.1, 467, 471, 473, 491, 490; 34/96

(56) References Cited

U.S. PATENT DOCUMENTS

| | | | | |
|---|---|---|---|---|
| 1,583,528 A | * | 5/1926 | Clements | ...................... 15/330 |
| 3,238,556 A | * | 3/1966 | Martin | .......................... 15/330 |
| 3,435,597 A | * | 4/1969 | Levy | ............................. 55/490 |
| 3,907,531 A | * | 9/1975 | Lee et al. | ...................... 55/491 |
| 4,187,577 A | * | 2/1980 | Hansen et al. | ................ 15/405 |
| 4,288,886 A | * | 9/1981 | Siegler | ......................... 15/330 |
| 5,052,073 A | * | 10/1991 | Iida | ............................ 15/327.5 |

FOREIGN PATENT DOCUMENTS

| | | |
|---|---|---|
| JP | 63-123795 | 8/1988 |
| JP | 2001-241019 | 9/2001 |

OTHER PUBLICATIONS

English Language Abstract of Japanese Pat. Pub. No. 2001–241019.

* cited by examiner

*Primary Examiner*—Theresa T. Snider
(74) *Attorney, Agent, or Firm*—Michael D. Bednarek; Shaw Pittman LLP

(57) ABSTRACT

A power blower having a frame, a blower, and a loop-shaped filter member. In an embodiment of the invention, the blower is disposed apart from the frame by an air intake space and has an air intake port facing the frame, and the loop-shaped filter member is disposed around a periphery of the air intake port and is adapted to catch debris on an upstream side of the air intake port.

20 Claims, 4 Drawing Sheets

POWER BLOWER HAVING A DEBRIS-CATCHING FILTER MEMBER

This application claims the benefit of Japanese Patent Application Number 2001-155247, filed May 24, 2001.

BACKGROUND

1. Field of the Invention

The present invention relates to power blowers, and more specifically, to a power blower that inhibits debris from collecting around the air intake space of the blower and provides convenient means for removing debris that does collect.

2. Background of the Invention

Backpack-type power blowers (also commonly referred to as leaf blowers and yard blowers) are typically used to drift fallen leaves and lawn clippings. The motor-driven fan of a power blower draws air in through an air intake port and forces air out through a discharge port. The air intake port is typically covered with a meshed ventilation cover to prevent objects from entering the air intake port and contacting the fan.

Unfortunately, when the air intake port is covered by the ventilation cover, debris such as fallen leaves may stick to the ventilation cover due to the incoming airflow. This obstruction can disadvantageously lower the air intake efficiency of the blower, and can damage the prime mover (e.g., gasoline engine) driving the blower by impeding the supply of cooling air.

In this situation, the user must turn off the blower and remove the debris from the ventilation cover. However, removal of debris is a complicated and time-consuming effort because the user must insert his or her hand deep within the typically narrow air intake space. Therefore, the efficiency of both the user and the power blower is compromised.

SUMMARY OF THE INVENTION

Accordingly, an object of the present invention is to provide a power blower that inhibits debris from collecting on the power blower and enables the convenient removal of debris that does happen to collect.

An embodiment of the present invention provides a power blower having a frame, a blower, and a loop-shaped filter member. The blower is disposed apart from the frame by an air intake space and has an air intake port facing the frame. The loop-shaped filter member is disposed around a periphery of the air intake port and is adapted to catch debris on an upstream side of the air intake port.

When this exemplary power blower is in operation, the blower sucks air through the air intake space and into the air intake port. Debris (e.g., fallen leaves) that is carried in this intake airflow is caught by the filter member on the upstream side of the air intake port. Because the filter member is disposed on the upstream side of the air intake port and surrounds the outer periphery of the air intake port, the user can conveniently reach it from the outside of the air intake space. Therefore, the user can conveniently remove debris caught by the filter member, and avoid the obstructions that lead to reduced airflow efficiency. The user can remove the debris even when the blower is in operation.

In an embodiment of the present invention, the power blower further comprises a member disposed in the air intake space to support the filter member. The member could be, for example, a loop-shaped ventilation cover adapted to surround the periphery of the air intake port, a vibration proof member for supporting the blower on the frame, a mounting seat portion formed for mounting the blower on the frame, or combinations thereof. As one of ordinary skill in the art would appreciate, other types of members existing in the air intake space could be used. In this arrangement, it is not necessary to provide a member dedicated to supporting the filter member. Thus, the number of the components in the blower can be reduced. In addition, using a member that already exists within the air intake space enables a user to remove debris caught by the filter member without being hindered by the existing member.

In the embodiment using the loop-shaped ventilation cover as the support member, the loop-shaped cover can provide a larger total ventilation area in comparison to conventional ventilation covers that are disposed directly over the air intake port. This larger ventilation area enables the present invention to provide a better air intake efficiency. In addition, the larger ventilation area decreases the intake airflow velocity across the cover, thereby decreasing the likelihood that debris is drawn to and held on the filter member.

Thus, the embodiment of the present invention promotes an unobstructed airflow path to the air intake port and avoids the problem of reduced air intake efficiency prevalent with prior art blowers. Moreover, even if debris collects on the filter member of the present invention, a user can conveniently remove the debris.

In an embodiment of the present invention, the filter member is formed of a flexible band-shaped member having a plurality of breathing holes and having a width corresponding to width of the air intake space. Because the flexible filter member can be freely deformed, it can be conveniently mounted over the air intake space. In a further embodiment, the flexible band-shaped member has at least two engaging portions adapted to engage and disengage each other. For example, each end of the flexible band-shaped member could have an engaging portion (e.g., a surface-fitting fastener) to connect and disconnect the ends of the member together, for attaching the filter member to and detaching the filter member from the power blower. In this manner, a user can conveniently and quickly remove debris caught by the filter member.

In another embodiment of the present invention, the filter member is formed of a brush member having debris-catching bristles planted in a flexible core member in a radial direction, and having an outer diameter corresponding to the width of the air intake space. In this case, the gaps between the bristles serve as breathing holes. In a further embodiment, the brush member has at least two engaging portions adapted to engage and disengage each other. For example, each end of the brush member could have an engaging portion (e.g., a hook on one end and a ring on the other end) to connect and disconnect the ends of the member together, for attaching the filter member to and detaching the filter member from the power blower. In this manner, a user can conveniently and quickly remove debris caught by the filter member.

A power blower according to another embodiment of the present invention includes a frame, a blower disposed apart from the frame by an air intake space and having an air intake port facing the frame, and a detachable filter member for catching debris. In this embodiment, the filter member has a loop shape and is disposed on an upstream side of the air intake port.

Another embodiment of the present invention provides a filter member for catching debris in a power blower. In this embodiment, the power blower includes a frame, and a blower disposed apart from the frame by an air intake space and having an air intake port facing the frame. The filter member includes an air-permeable flexible body and at least two engaging portions on the flexible body adapted to engage and disengage each other. The filter member is disposed in a loop shape in the air intake space on the upstream side of the air intake port.

In a further aspect of this embodiment, the flexible body is a band-shaped member having a width corresponding to the air intake space. When using a band-shaped member as the flexible body, the engaging portions could be a first surface-fitting fastener mounted at a first end of the flexible body and a second surface-fitting fastener mounted at a second end of the flexible body.

In a further aspect of this embodiment, the flexible body is a brush member having an outer diameter corresponding to the air intake space. The brush member could be, for example, a flexible core member with bristles planted on the core member in a radial direction.

DETAILED DESCRIPTION

Figure 1:
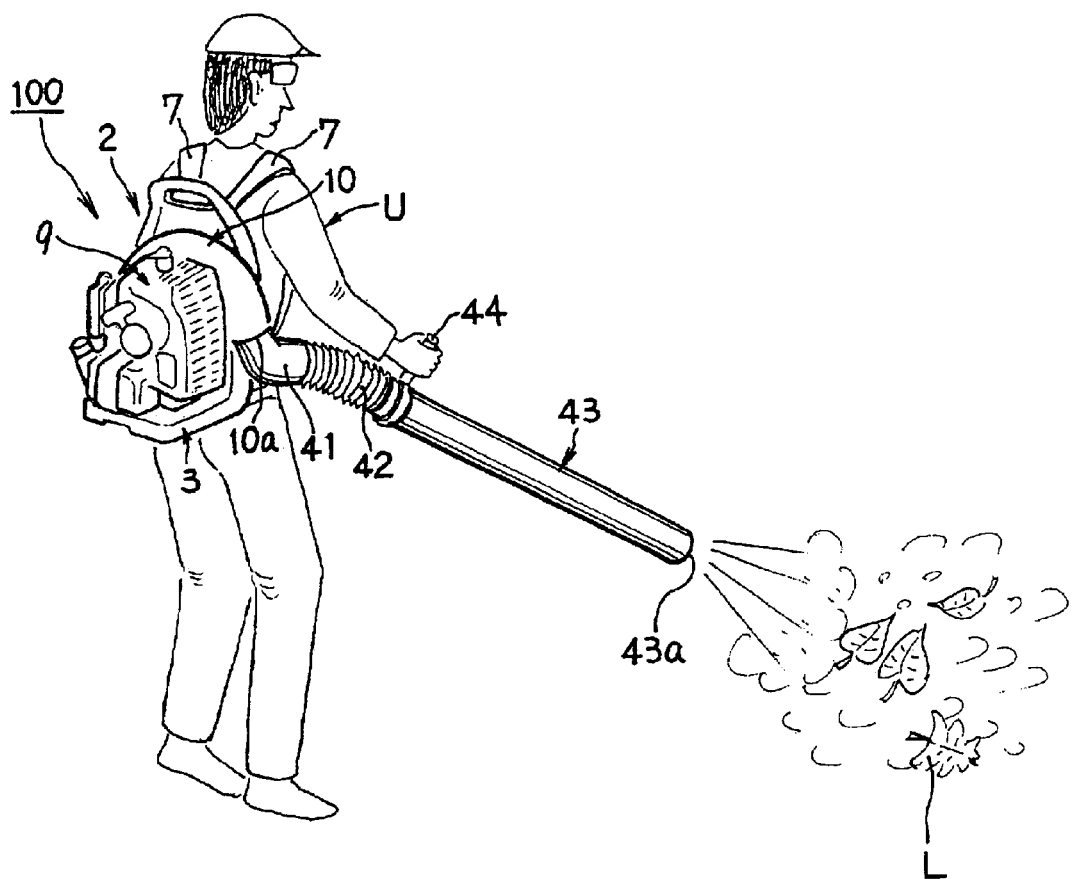
FIG. 1 is a schematic diagram showing a perspective view of an exemplary power blower in use, according to an embodiment of the present invention.

FIG. 1 illustrates a power blower 100 according to an embodiment of the present invention. As shown, the power blower 100, which in this example is a backpack-type power blower, includes a backpack frame 2. In this specific implementation, the backpack frame 2 has a pair of left and right shoulder belts 7 for carrying the frame 2 on the back of a user U. A blower 10, such as a centrifugal-type blower, is mounted on the frame 2. An internal combustion engine 9, such as an air-cooled two-cycle gasoline engine, is also mounted on the frame 2 and acts as a prime mover for driving the blower 10. An air-blowing pipe 43 is connected via an elbow pipe 41 and a bellows hose 42 to an air discharging port 10a of the blower 10.

The user U puts the backpack frame 2 on his or her back with the pair of left and right shoulder belts 7, holds a handle 44 attached to the proximal end of the air-blowing pipe 43, and drifts debris, such as fallen leaves L, by blowing air from the discharging port 43a of the air-blowing pipe 43, while controlling the direction of the air-blowing pipe 43 and the speed of the internal combustion engine 9.

Figure 2:
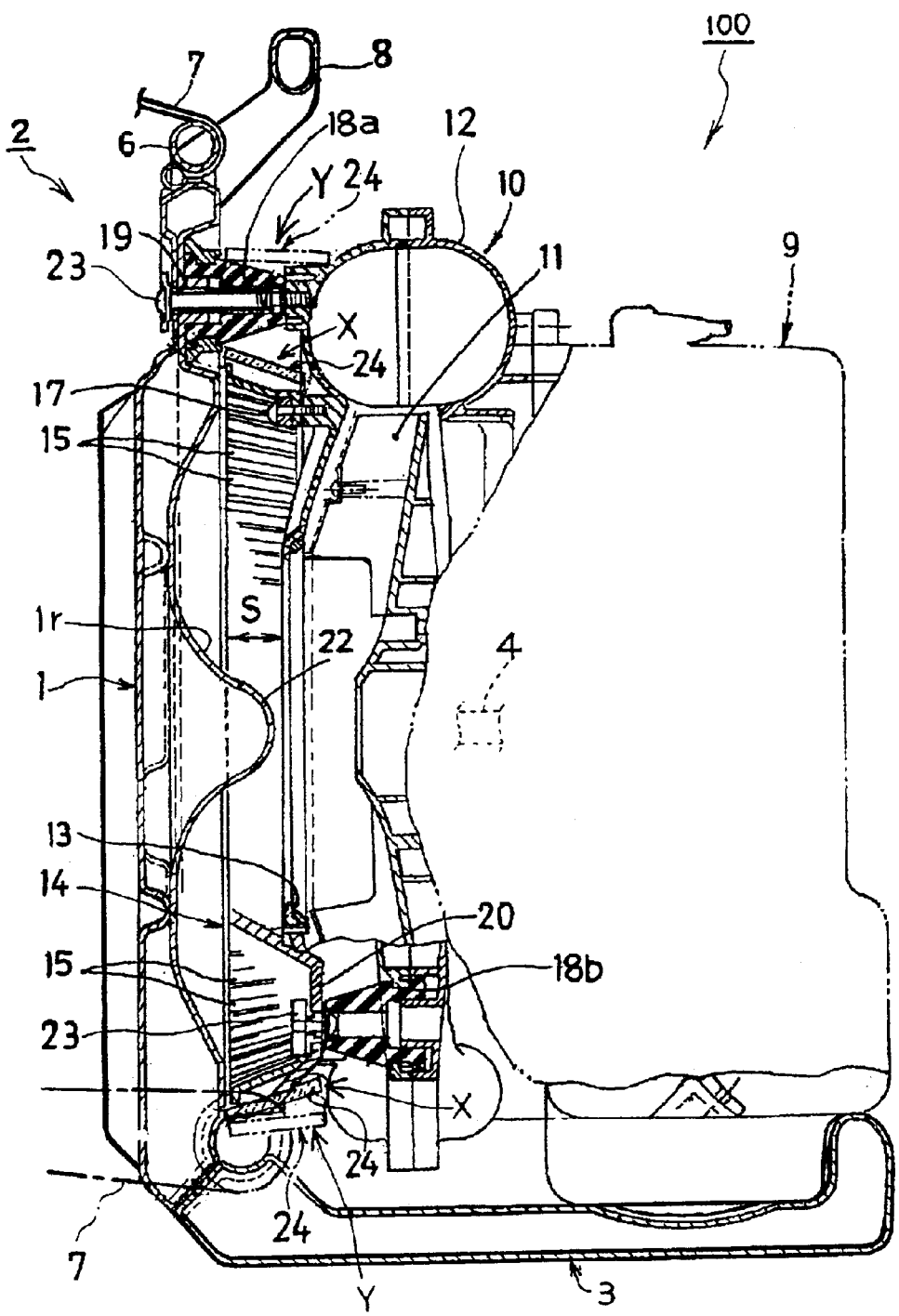
FIG. 2 is a schematic diagram showing a left side view in vertical cross section of the body portion of the exemplary power blower shown in FIG. 1.

As shown in FIG. 2, the backpack frame 2 includes a back portion 1 extending in the substantially vertical direction, a base portion 3 extending from the lower end of the back portion 1 rearward of the user U in a substantially horizontal direction, and formed in a substantially L-shape when viewed from the left side. The back portion 1 has an integral carrying handle 8 at its top for transporting the power blower 100 by hand. The back portion 1 is integrally formed on its back side 1r with a single mounting seat 19 at the center of the upper side, and a pair of left and right mounting seats 20 at the lower side. The blower 10 is connected to the mounting seats 19, 20 via a suitable vibration proof members 18a, 18b, such as a rubber block with locking screws 23. The internal combustion engine 9 is directly connected to the blower 10. The blower 10 is located between the internal combustion engine 9 and the back side 1r of the back portion 1. The backpack frame 2 may be integrally formed of light and durable plastic material, for example, by blow molding.

An air intake port 13 of the blower 10 faces the back side 1r of the back portion 1. An air intake space S of a prescribed dimension is provided between the back side 1r and the blower 10. The back portion 1 has an integral air intake guide portion 22 at the central portion of the back side 1r. The air intake guide portion 22 guides the incoming airflow smoothly toward the air intake port 13.

The blower 10 includes a volute case 12 as a blower case and a centrifugal fan 11 rotatably supported in the volute case 12. The centrifugal fan 11 is operationally connected to an output shaft 4 of the internal combustion engine 9, and is driven by the internal combustion engine 9. Air around the backpack frame 2 is sucked into the volute case 12 from the air intake port 13 through the air intake space S by the rotation of the centrifugal fan 11, and is discharged from air discharging port 10a (see FIG. 1) of the volute case 12 in a rapid airflow.

An intake grid 14 serves as a ventilation cover and is disposed in the air intake space S between the back portion 1 and the blower 10. The intake grid 14 is formed in a loop shape around the outer periphery of the air intake port 13. The intake grid 14 prevents a finger of the user U from entering the air intake port 13 through the air intake space S.

In this embodiment, the intake grid 14 has a short cylindrical shape that increases in diameter in a direction from the blower 10 toward the back portion 1, and is formed with a number of breathing holes 15 (e.g., slits) on its peripheral wall. The intake grid 14 is disposed in the process of assembling power blower 100 with the center of the intake grid 14's cylinder coincided with the air intake port 13, and secured on the front surface of the volute case 12 of the blower 10 by means of mounting screws 17. The intake grid 14 can be formed of flexible material such as plastic.

In this embodiment, an air-permeable filter member 24 is disposed in a loop shape around the outer periphery X—X of the intake grid 14. The filter member 24 catches debris, such as fallen leaves L, which are drawn by the intake airflow of the blower 10 to the upstream side of the intake grid 14. The filter member 24 also prevents a finger of the user U from entering the air intake port 13 through the air intake space S.

Figure 3:
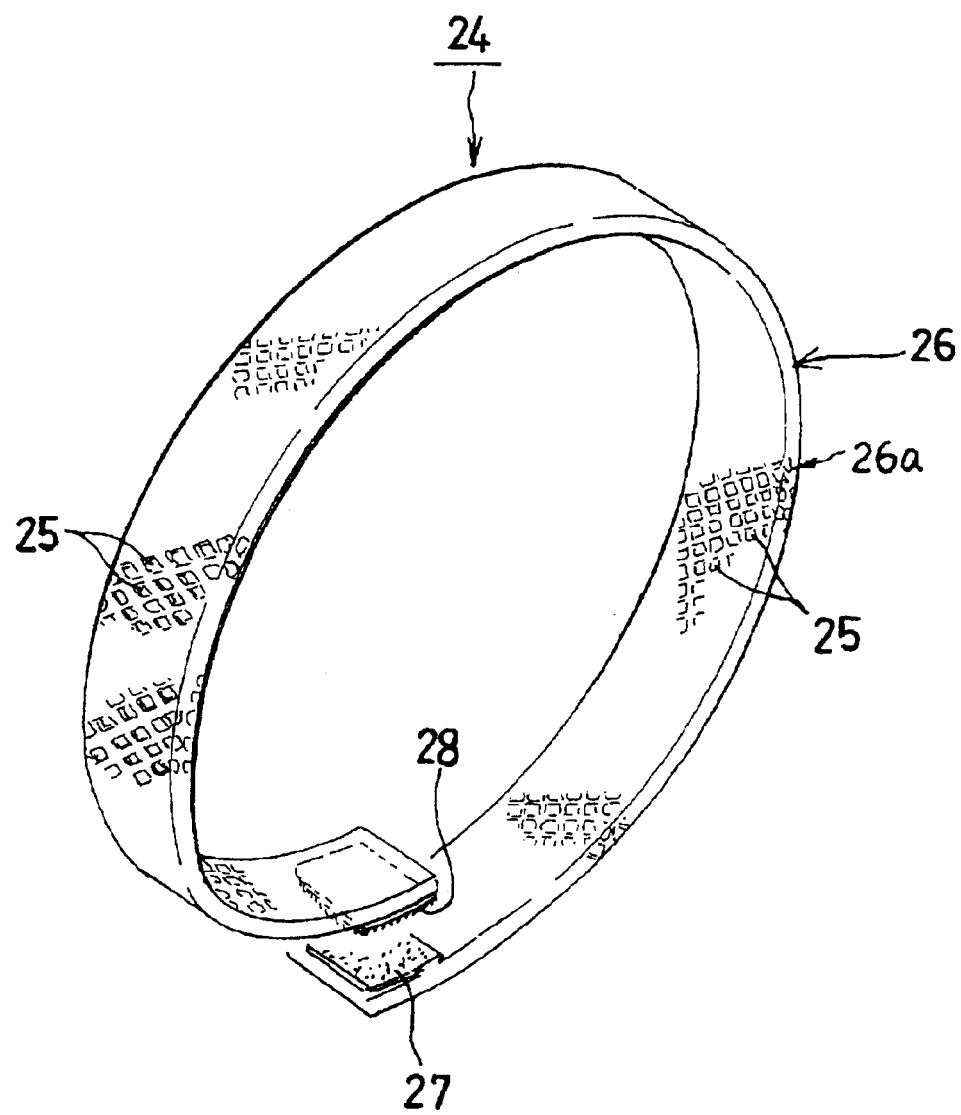
FIG. 3 is a schematic diagram showing a perspective view of a first exemplary filter member, according to an embodiment of the present invention.

According to an embodiment of the present invention, the filter member 24 is, as shown in FIG. 3, a flexible band-shaped member 26 having number of breathing holes 25. The flexible body 26a of the flexible band-shaped member 26 has a width corresponding to the width of the air intake space S, and a length sufficient for surrounding the outer periphery X—X of the intake grid 14. The flexible body 26a is formed with engaging portions being capable of engaging and disengaging each other at both ends thereof. For example, in the embodiment shown in FIG. 3, surface-fitting fasteners (e.g., hook and loop fasteners) 27,28 are attached on the opposite surfaces of the flexible body 26a at the ends of the flexible band-shaped member 26. The surface-fitting fastener 27 is attached on the inside of the flexible band-shaped member 26, while the surface-fitting fastener 28 is attached on the outside of the flexible band-shaped member 26. The flexible band-shaped member 26 is wound around the outer periphery X—X of the intake grid 14 in the air intake space S and mounted on the power blower 100 by joining the surface-fitting fasteners 27, 28 to each other. Therefore, the intake grid 14, when disposed in the air intake space S, also serves as a support member for the filter member 24.

The flexible band-shaped member 26 can be deformed freely in accordance with the shape of the structure on which it is mounted, and may be formed, for example, of cloth or net.

The filter member 24 can be conveniently attached to and detached from the power blower 100. Therefore, when a large amount of debris L has collected on the filter member 24, the debris L can be knocked off by detaching the filter member 14 from the power blower 100. The filter member 24 can then be attached again to the power blower 100.

The filter member 24 is mounted on the power blower 100 using the intake grid 14, which is an existing member, as the support member. Therefore, it is not necessary to provide a specific support member for supporting the filter member 24, thereby decreasing the number of necessary components.

As another embodiment, as shown in FIG. 3, it is also possible to attach the flexible band-shaped member 26 to the power blower 100 around existing members in the air intake space S. For example, the flexible band-shaped member 26 can be attached around the outer periphery Y—Y of the vibration proof member 18a and the mounting seats 20, which are disposed in the air intake space S. In this case, the length of the flexible body 26a is pre-selected to reach around the outer periphery Y—Y of the vibration proof member 18a and the mounting seats 20.

In an alternative embodiment of the present invention, a meshed air intake port cover in the shape of a lid covers the air inlet port 13 and serves as the ventilation cover, instead of the short cylindrical loop-shaped intake grid 14 described above. In this configuration, the flexible band-shaped member 26 may be mounted on the power blower 100 so as to surround the outer periphery Y—Y of the vibration proof member 18a and the mounting seats 20. However, because the loop-shaped intake grid 14 provides a total ventilation area larger than the lid-shaped air grid, the loop-shaped intake grid 14 can achieve a more efficient airflow.

Figure 4:
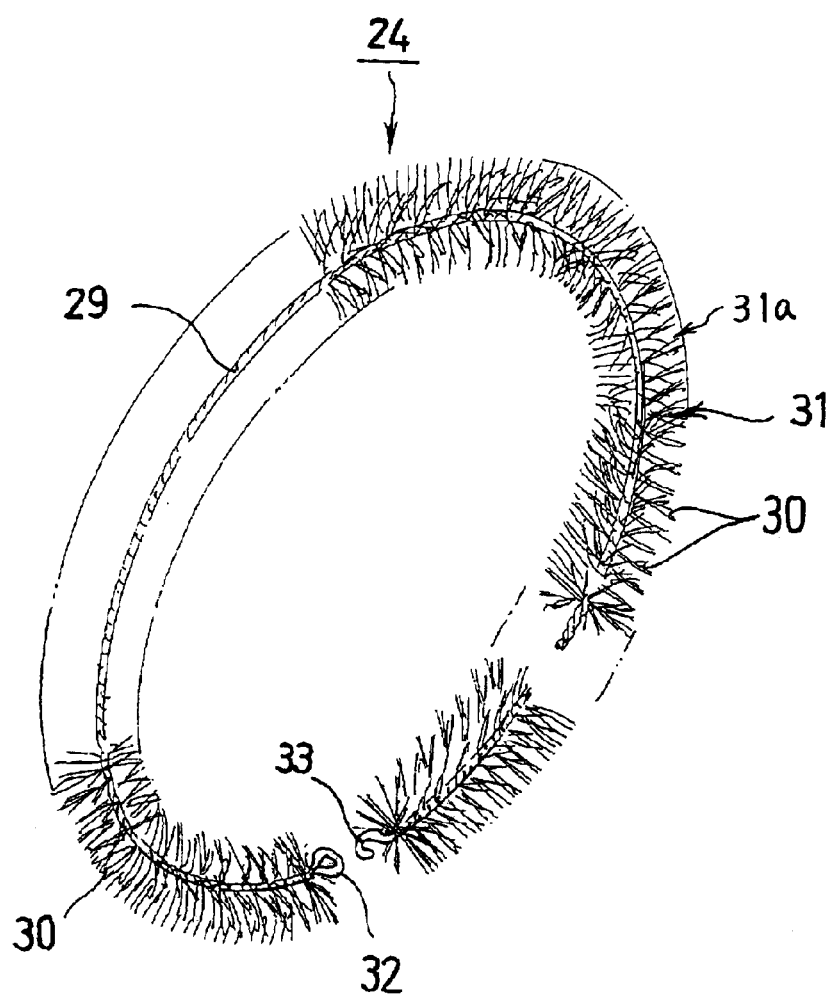
FIG. 4 is a schematic diagram showing a perspective view of a second exemplary filter member, according to another embodiment of the present invention.

Another embodiment of the filter member 24 is shown in FIG. 4. In this embodiment, the filter member 24 is a brush member 31 having a number of debris-catching bristles 30 attached to or planted on a core member 29 (e.g., a flexible metallic or plastic wire) in a radial direction. The cylindrical flexible body 31a of the brush member 31 has an outer diameter corresponding to the width of the air intake space S and is of a length sufficient for surrounding the outer periphery X—X of the intake grid 14 or the outer periphery Y—Y of the vibration proof member 18a and the mounting seats 20. The flexible body 31a is formed with engaging portions, which are capable of engaging and disengaging each other. In the example shown in FIG. 4, the core member 29 is formed with a hook 33 on one end and a ring 32 on the other end. The brush member 31 is wound around the outer periphery X—X of the intake grid 14 or the outer periphery Y—Y of the vibration proof member 18a and the mounting seats 20 in the air intake space S in the same way that the flexible band-shaped member 26 is wound, as described above. The brush member 29 is mounted on the power blower 100 by the engaging hook 33 and the ring 32.

In the brush member 31, the spaces among the bristles 30 serve as breathing holes through which air is drawn by the operation of the blower 10. Because the individual spaces between the bristles 30 can be configured quite small, fine debris L can also be caught. In addition, because the brush member 31 has breathing holes uniformly distributed over its entire area, it provides a large area of air ventilation and does not impair the airflow induced by the blower 10.

The hardness of the bristles 30 is preferably such that they do not injure the finger or hand of the user U when the user U touches the bristles.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A power blower comprising:
  a frame having a surface;
  a blower having an air intake port disposed on the frame with an air intake space between the surface of the frame and the air intake port; and
  a ring-shaped filter member disposed around a periphery of the cover, wherein the filter member is adapted to catch debris on an upstream side of the air intake port.

2. The power blower of claim 1, wherein the blower further comprises a member disposed in the air intake space, and wherein the member supports the filter member.

3. The power blower of claim 2, wherein the member is a ring-shaped ventilation cover adapted to surround the periphery of the air intake port.

4. The power blower of claim 2, wherein the member is a vibration proof member for supporting the blower on the frame.

5. The power blower of claim 2, wherein the member is a mounting seat for mounting the blower on the frame.

6. The power blower of claim 1, wherein the filter member is formed of a flexible belt-shaped member having a plurality of breathing holes and having a width corresponding to the width of the air intake space.

7. The power blower of claim 6, wherein the flexible belt-shaped member has at least two engaging portions adapted to engage and disengage each other.

8. The power blower of claim 1, wherein the filter member is a brush member having bristles radially planted in a flexible core member, and having an outer diameter corresponding to the width of the air intake space.

9. The power blower of claim 8, wherein the brush member has at least two engaging portions adapted to engage and disengage each other.

10. A power blower comprising:

a frame having a surface;

a blower having an air intake port disposed on the frame with an air intake space between the surface of the frame and the air intake port; and a detachable filter member for catching debris, wherein the detachable filter member has a ring shape and is disposed on an upstream side of the air intake port.

11. The power blower of claim 10, wherein the blower further comprises a member disposed in the air intake space, and wherein the member supports the filter member.

12. The power blower of claim 11, wherein the member is a ring-shaped ventilation cover adapted to surround the periphery of the air intake port.

13. The power blower of claim 11, wherein the member is a vibration proof member for supporting the blower on the frame.

14. The power blower of claim 11, wherein the member is a mounting seat for mounting the blower on the frame.

15. The power blower of claim 10, wherein the filter member is formed of a flexible belt-shaped member having a plurality of breathing holes.

16. The power blower of claim 10, wherein the filter member is a brush member having bristles radially planted in a flexible core member.

17. A power blower comprising:

a frame having a surface;

a blower having an intake port, the blower disposed on the frame with an air intake space between the surface of the frame and the air intake port; and a filter member for catching debris comprising an air-permeable flexible body; and at least two engaging portions on the flexible body adapted to engage and disengage each other, wherein the filter member is disposed in a ring shape in the air intake space on an upstream side of the air intake port.

18. The power blower of claim 17, wherein the flexible body is a belt-shaped member having a width corresponding to the air intake space.

19. The power blower of claim 18, wherein the at least two engaging portions comprise a first surface-fitting fastener mounted at a first end of the flexible body and a second surface-fitting fastener mounted at a second end of the flexible body.

20. The power blower of claim 17, wherein the flexible body is a brush member having an outer diameter corresponding to the width of the air intake space, and wherein the brush member comprises a flexible core member and bristles planted on the core member in a radial direction.

* * * * *